United States Patent
Misener et al.

(10) Patent No.: US 9,602,299 B1
(45) Date of Patent: Mar. 21, 2017

(54) DETECTION OF DEVICE COMPLIANCE WITH AN OPERATIONAL POLICY

(75) Inventors: Paul E. Misener, Great Falls, VA (US); Gregg Elliott Zehr, Seattle, WA (US); David Y. Woo, Cupertino, CA (US)

(73) Assignee: Amazon Technologies, Inc., Reno, NV (US)

(*) Notice: Subject to any disclaimer, the term of this patent is extended or adjusted under 35 U.S.C. 154(b) by 501 days.

(21) Appl. No.: 13/226,115

(22) Filed: Sep. 6, 2011

(51) Int. Cl.
*G06F 11/30* (2006.01)
*G01D 3/00* (2006.01)
*H04L 12/26* (2006.01)

(52) U.S. Cl.
CPC ......... *H04L 12/2697* (2013.01); *H04L 43/50* (2013.01)

(58) Field of Classification Search
CPC ..... H01Q 1/225; G01F 23/284; H04W 48/04; G06F 1/1626; G06F 11/3409; H04M 1/72569; H04M 1/6075; H04M 1/72577; H04L 12/2697
USPC ...... 455/456.2, 1; 430/5.1, 825.49; 702/182, 702/115–116, 122; 340/5.1
See application file for complete search history.

(56) References Cited

U.S. PATENT DOCUMENTS

| | | | |
|---|---|---|---|
| 5,815,407 A | 9/1998 | Huffman et al. | |
| 6,832,093 B1 | 12/2004 | Ranta | |
| 7,102,511 B2 * | 9/2006 | Chen | 340/539.21 |
| 8,621,251 B1 | 12/2013 | Keller et al. | |
| 2002/0192009 A1 * | 12/2002 | Tuli | B43K 29/08 401/195 |
| 2008/0165146 A1 | 7/2008 | Matas | |
| 2009/0061897 A1 * | 3/2009 | Hamilton et al. | 455/456.2 |
| 2010/0267375 A1 * | 10/2010 | Lemmon | G06F 21/74 455/418 |
| 2011/0065375 A1 * | 3/2011 | Bradley | 455/1 |
| 2011/0183601 A1 * | 7/2011 | Hannon | 455/1 |
| 2011/0241827 A1 | 10/2011 | Varoglu | |
| 2012/0027265 A1 * | 2/2012 | Black | 382/117 |
| 2013/0187755 A1 * | 7/2013 | Rogers et al. | 340/5.61 |

OTHER PUBLICATIONS

Office action for U.S. Appl. No. 13/034,661, mailed on Jan. 22, 2013, Keller et al., "Device Operation in a Reduced Operational Mode", 11 pages.

(Continued)

*Primary Examiner* — Gregory J Toatley
*Assistant Examiner* — Eman Alkafawi
(74) *Attorney, Agent, or Firm* — Lee & Hayes, PLLC

(57) ABSTRACT

A detection device may monitor emissions from a computing device, which may include radiation and/or radio waves from a computing device. The emissions may be electromagnetic (EM) radiation indicative of operation of components of the computing device. When the emissions reach or exceed an emissions threshold, the detection device may output an indicator. The indicator may indicate a violation of an operational policy that is associated with the emissions threshold. The indicator may additionally or alternatively indicate compliance with the operation policy. In some embodiments, the detection device may be implemented as an accessory such as a case, a cover, a light, or another type of accessory for the computing device.

24 Claims, 10 Drawing Sheets

(56) References Cited

OTHER PUBLICATIONS

Office Action for U.S. Appl. No. 14/091,166, mailed on Oct. 10, 2014, Kevin E. Keller, "Device Operation in a Reduced Operational Mode", 11 pages.
Office action for U.S. Appl. No. 14/091,166 mailed on Nov. 5, 2015, Keller et al., "Device Operation in a Reduced Operational Mode", 9 pages.

* cited by examiner

DETECTION OF DEVICE COMPLIANCE WITH AN OPERATIONAL POLICY

BACKGROUND

Computing devices have become ubiquitous in almost every environment. Mobile telephones, laptop computers, tablet computers, and other devices are commonly used for work and pleasure and often accompany people in many daily activities. People often travel with computers and mobile phones, bring these devices to school, and use these devices in public places. Interacting with these devices has become part of daily routines and accepted social norms.

However, in some situations, the use of computing devices may be restricted or otherwise not permitted for various reasons. For example, the Federal Aviation Agency (FAA) guidelines restrict use of computing devices by passengers during takeoff and landing of commercial aircraft. In some academic environments, use of communicating devices may be restricted at times, such as during an examination.

Other environments may limit use of some functionality of a computing device. For example, a museum may allow use of a mobile phone for text messaging and email, but may restrict use of the device for voice calls and photography.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
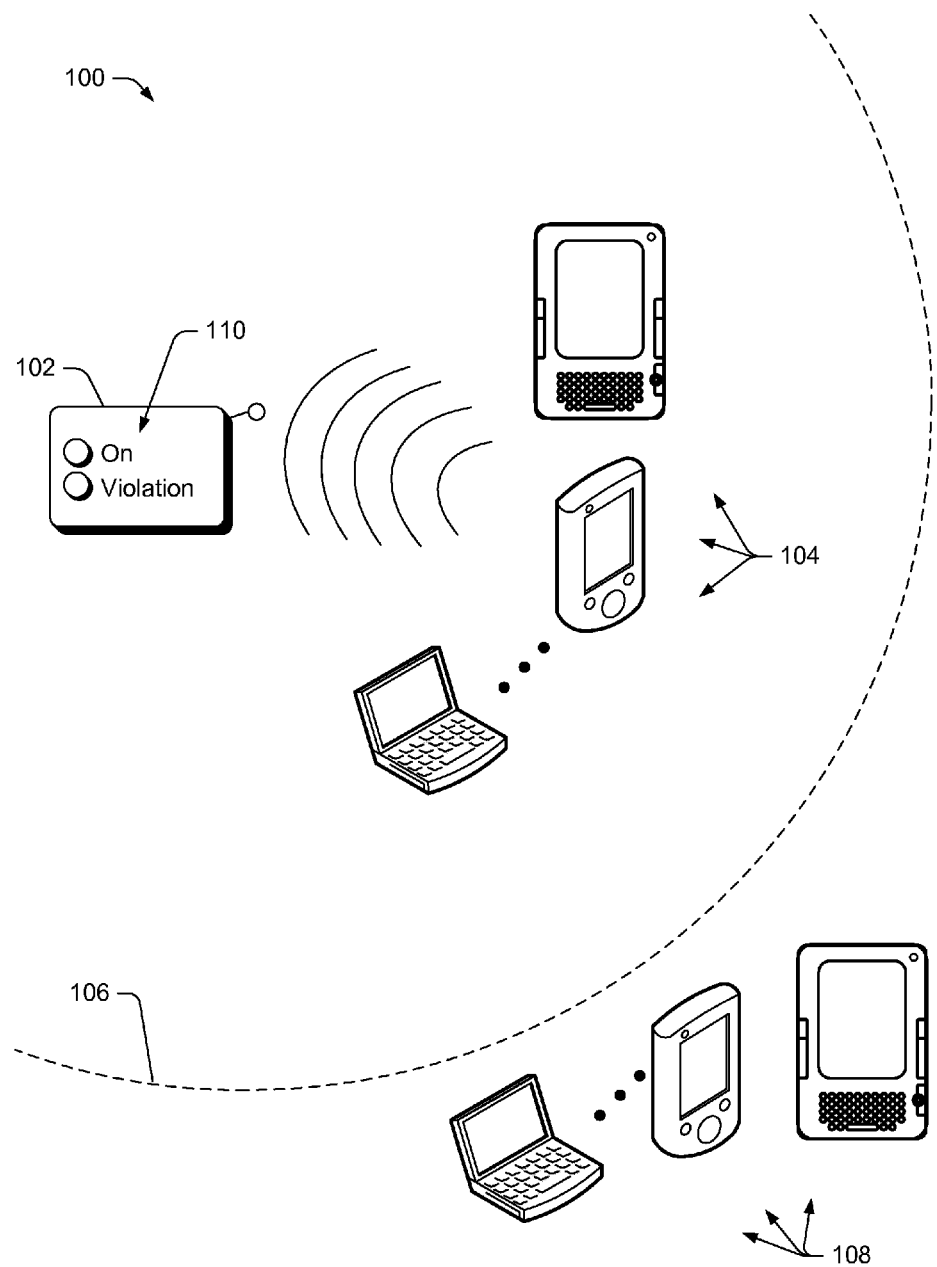
FIG. 1 is a schematic diagram of an illustrative environment that shows a detection device that detects radiation emissions from computing devices within a threshold distance from the detection device.

This disclosure is directed to external monitoring of computer devices to indicate whether the computing devices are operating in accordance with or are in violation of an operational policy. In some embodiments, a detection device may monitor radiation emissions from computing devices. The radiation emissions may be electromagnetic (EM) radiation and/or other types of radiation, which may be indicative of some types of operation of the computing devices. For example, operation of central processor units (CPUs), graphic processor units (GPUs), displays, and/or other hardware components may cause the computing device to emit EM radiation, which may be detectable by the detection device that is located proximate the computing device. When the detected radiation reaches or exceeds an emissions threshold, the detection device may output an indicator. The indicator may indicate a violation of an operational policy that is associated with the emissions threshold. The indicator may additionally or alternatively indicate compliance with the operation policy. For example, the indicator may emit a green light when in the detected radiation is below the emissions threshold (i.e., in compliance of the operational policy) and may emit a red light when the detected radiation reaches or exceeds the emissions threshold. In other instances, the indicator may output a sound, haptic feedback, or any other sort of perceivable indication regarding whether a device emits radiation that is less than or greater than the emissions threshold.

In various embodiments, the detection device may detect use of a communication component such as a transmitter, receiver, and/or transceiver for wireless communications (e.g., mobile telephone communications, Bluetooth®, Wi-Fi, etc.). The detection device may attempt to communicate with the communication component to determine whether the communication component is powered on, which may be in violation of the operational policy.

In some embodiments, the detection device may be implemented as an accessory for the computing device. For example, the detection device may be implemented in a case, a cover, a light, or another type of accessory for the computing device. The accessory may include a compliance indicator and/or a violation indicator that is visible to or audible by a bystander. This may allow a user to certify that his or her computing device is operating in compliance with the operational policy. The detection device may also be implemented separate from the computing device, such as by implementation as a portable device (e.g., as a wand, etc.) and/or by implementation with a fixture (e.g., a seat, wall, divider, overhead console, etc.). In these implementations, the detection device may indicate or emit a signal when computing devices are operating in violation of the operational policy.

In some embodiments, the detection device may identify a location of a computing device that is operating in violation of the operational policy. The detection device may transmit this information to a centralized location for reporting purposes and/or to enable an administrator to take corrective action (e.g., ask offending users to power down computing devices, turn off a portion of a device's functionality, etc.).

The techniques and systems described herein may be implemented in a number of ways. Example implementations are provided below with reference to the following figures.

Illustrative Environments

FIG. 1 is a schematic diagram of an illustrative environment 100 that shows a detection device that detects emissions from computing devices within a threshold distance from the detection device. The environment 100 includes a detection device 102 that may be capable of detecting operation of one or more computing devices 104 that are within a boundary 106 (e.g., within a threshold distance of the detection device). The detection device 102 may detect operation of the computing devices 104 by measuring electromagnetic (EM) radiation, by initializing wireless communication with the computing devices, or by other detection techniques, which may determine an operational state of the computing devices 104. The detection device 102 may not detect an operational state of other computing devices 108 that are located outside of the boundary 106.

The detection device 102 may include indicators 110, such as a power indicator and a violation/compliance indicator. In some embodiments, the detector may provide an indication when the computing devices 104 are operating in compliance with an operational policy, such as when the computing device have associated wireless transmitters powered off. However, when one of the computing devices 104 has a wireless transmitter that is powered on and is in violation of the above example operational policy, then the detection device 102 may indicate the violation using one of the indicators 110. The indicators may be visual indicators, audio indicators, tactile indicators (e.g., vibration, etc.), or a combination thereof.

The detection device 102 may be configured to detect various operational states of the computing devices 104, such as operation of one or more of CPUs, GPUs, wireless communication devices, displays, and/or other components of the computing devices. In some embodiments, the detection device 102 may be configured to detect operation of the computing devices 104 that reaches or exceeds a threshold EM radiation emission. For example, one of the computing devices may operate in a reduced power state where its CPU is running below half power. In this example, the computing device may emit EM radiation that is below a threshold EM radiation emission (possibly set by a user of the detection device), which may result in the detection device identifying the computing device as compliant with the operational policy. In another example, an operational policy may include an absolute condition that bans any use of a particular component, such as use of a wireless communication device. In this example, any computing devices that transmit wireless signals (or have a wireless transmitter powered on) may be designated as violators by the detection device.

Figure 2:
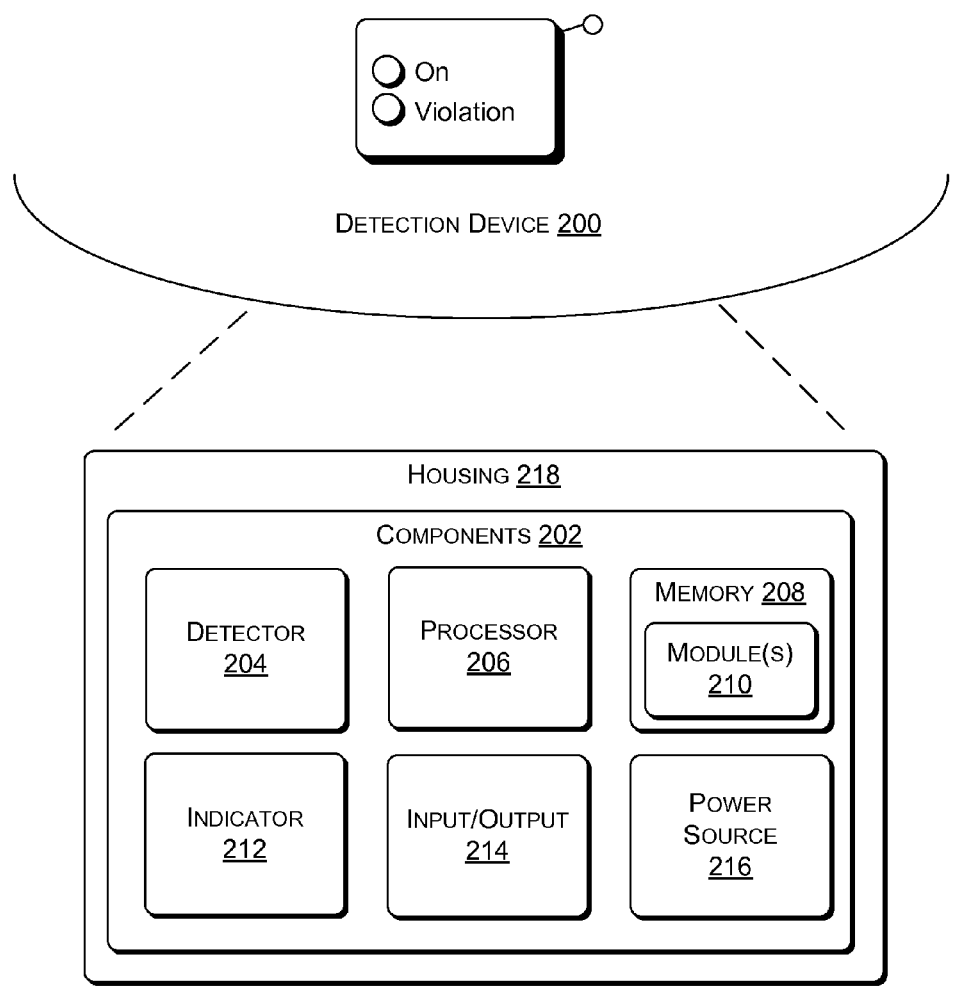
FIG. 2 is a schematic diagram of an illustrative detection device to detect and indicate use of a computing device that violates an operational policy.

FIG. 2 is a schematic diagram of an illustrative detection device 200 to detect and indicate use of a computing device that violates an operational policy. The detection device 200 may include various components 202 that are described in turn.

In some embodiments, the components 202 may include a detector 204 that detects radiation emissions of a computing device located within threshold distance of the detection device 200. The detector 204 may detect intentional and/or unintentional emissions of radiation, which may be caused by power consumption of the computing device (unintentional) and/or use of a transmitter of the computing device (intentional). In some embodiments, the detector 204 may be implemented as a dosimeter to detect the emissions of radiation, such as EM radiation. In various embodiments, the detector 204 may detect emissions of radio waves emitted by the computing device using a radio wave detection device such as disclosed by U.S. Pat. No. 7,102,511. In accordance with one or more embodiments, the detector 204 may attempt to connect to a wireless transceiver to provide intentional radiation, such as by performing a handshake protocol with a wireless transceiver of the computing device to determine whether the computing device has deactivated the wireless transceiver in compliance with an operational policy. In further embodiments, the detector 204 may be implemented using combinations of some or all of the above detection techniques.

The components 202 may include a processor 206 and memory 208 that stores various modules 210, such as applications, programs, and/or other data. The memory may be computer-readable media and may include volatile and non-volatile, removable, and non-removable media implemented in any method or technology for storage of information, such as computer readable instructions, data structures, program modules, or other data, which may be included in removable storage and in the non-removable storage. The memory 208 may include instructions that, when executed by the processor 206, cause the processor to perform the operations described herein for the detection device 200. For example, the modules 210 may control operation of the detector 204, an indicator 212, input/output devices 214 (e.g., a user interface, a wireless communication device, etc.) and/or other components.

The indicator 212 may provide an indication to a user, a centralized repository, and/or other sources based on activity of the detector 204. For example, the indicator 212 may provide an output upon determination of a computing device that operates in violation of an operational policy, such as a computing device that uses or has a wireless transmitter that is powered on or emits EM radiation that reaches or exceeds an emissions threshold. In some embodiments, the indicator 212 may provide location information and/or other identification information of a computing device that violations the operational policy as discussed below.

In accordance with one or more embodiments, the input/output devices 214 may include a wireless communication device to enable the detection device 200 to initiate a handshake with the computing device. The input/output devices 214 may also include a user interface (UI) to enable a user to select detection options, which may ultimately control the operation of the detector 204. Other input/output devices may include data ports to enable physical connection between the detection device 200 and another device, such as one of the computing devices. For example, the detection device 200 may physically connect to one of the computing devices to share a power source of the computing device when the detection device is implemented as an accessory such as a cover, lamp, or other type of accessory that also provides the aforementioned detection capabilities.

The components 202 may also include a power source 216 which may enable the detection device 200 to operate without reliance on power from an external device (e.g., one of the computing devices, etc.). The power source 216 may be a battery pack or other type of power source that provides power to the various components 202. A housing 218 may be used to secure the components 202. In some embodiments, the housing 218 may include a functional design to optimize use of the detection device 200 by a user. For example, the housing 218 may be formed as a wand, as an accessory cover, or as various other types of handheld or accessory shapes or forms. Sample housings are shown in FIGS. 6-9.

Figure 3:
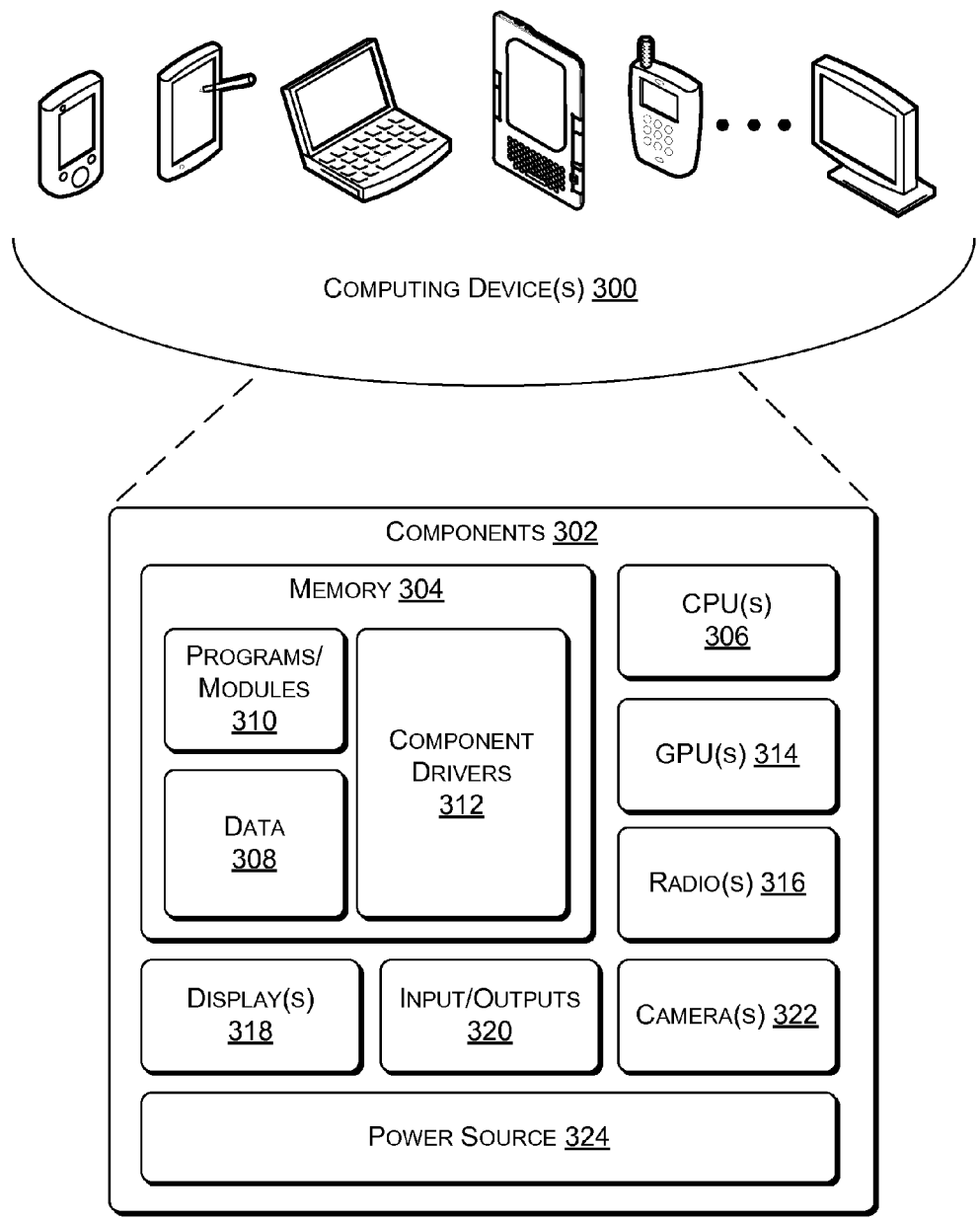
FIG. 3 is a schematic diagram of an illustrative computing device that may be exposed to the detection device or implemented with the detection device.

FIG. 3 is a schematic diagram of an illustrative computing device 300 that may be exposed to the detection device 200 or implemented with the detection device. In the illustrated implementation, the computing device 300 is represented by various computing devices that each includes a power source and an output mechanism, such as a display. A non-exhaustive list of possible computing devices may include a notebook computer, a music player, a mobile telephone (including smartphones), a tablet computer, an electronic book (eBook) reader device, and a monitor (with or without a television tuner), and so forth.

As illustrated, the computing device 300 includes various components 302. In some embodiments, the components 302 include memory 304 and one or more central processing unit(s) (CPU) 306. The CPU(s) 306 interact with the memory 304 to execute instructions and facilitate operation of the computing device 300. The memory 304, meanwhile, may be used to store data 308, such as data files, audio and/or video media, electronic books (eBooks), or the like. The memory 304 may also include software programs or other executable modules 310 that may be executed by the CPU(s) 306. Examples of such programs or modules include indexing modules for indexing data, reader programs, control modules (e.g., power management), network connection software, an operating system, sensor algorithms, and so forth.

The memory 304 may include volatile memory (such as RAM), nonvolatile memory, removable memory, and/or non-removable memory, implemented in any method or technology for storage of information, such as computer-readable instructions, data structures, program modules, or other data. Also, the CPU(s) 306 may include onboard memory in addition to or instead of the memory 304. Some examples of storage media that may be included in the memory 304 and/or CPU(s) 306 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the computing device 300. Any such computer-readable media may be part of the computing device 300.

The memory 304 may store component drivers 312 that include instructions that, when executed by the CPU(s), are used to control the various components 302. For example, the component drivers 312 are programs that can be used to control the operation, power consumption, and various operational states of each of the components 302. Typically, each component has its own corresponding component driver.

The components 302 may also include graphics processor unit(s) (GPU) 314, radio(s) 316, display(s) 318, input/output devices 320, and/or camera(s) 322. The GPU(s) 314 may be used to perform graphical processing operations or other general purpose operations, such as load balancing with the CPU(s) 306. The radio(s) 316 may include any type of wireless communication device that includes a receiver, transmitter, and/or a transceiver. For example, the radio(s) may include one or more of a Wi-Fi radio, a mobile communications radio (3G, 4G, etc.), a Bluetooth® radio, a global positioning system (GPS) radio, a radio frequency identification (RFID) reader or other types of radios. The display(s) 318 may include liquid crystal displays, electronic ink displays, or other types of displays capable of displaying text, images, and/or video. The input/output device(s) 320 may include, without limitation, audio, speakers, a microphone, storage drives such as CD/DVD/Blue Ray®, flash memory, compact storage, a wired network adapter, and so forth. The camera 322 may include one or more still image or video cameras. In addition, the computing device 300 may include a power source 324 to provide power to operation the various components 302.

The some or all of the components 302 (including the CPU 306, the GPU 314, the radio(s) 316, the display(s) 318, the input/output devices 320, and the camera(s) 322) may emit EM radiation when in use (e.g., powered on, etc.). In particular, components that use large amounts of power, such as the CPU 306 and the GPU 314 may be particularly conducive to detection based on their emissions of EM radiation since these components are often running. However, these components (and other components) may also be powered down or throttled by a user (via user settings, operational modes, etc.) to allow the computing device to operate while emitting less EM radiation.

Figure 4:
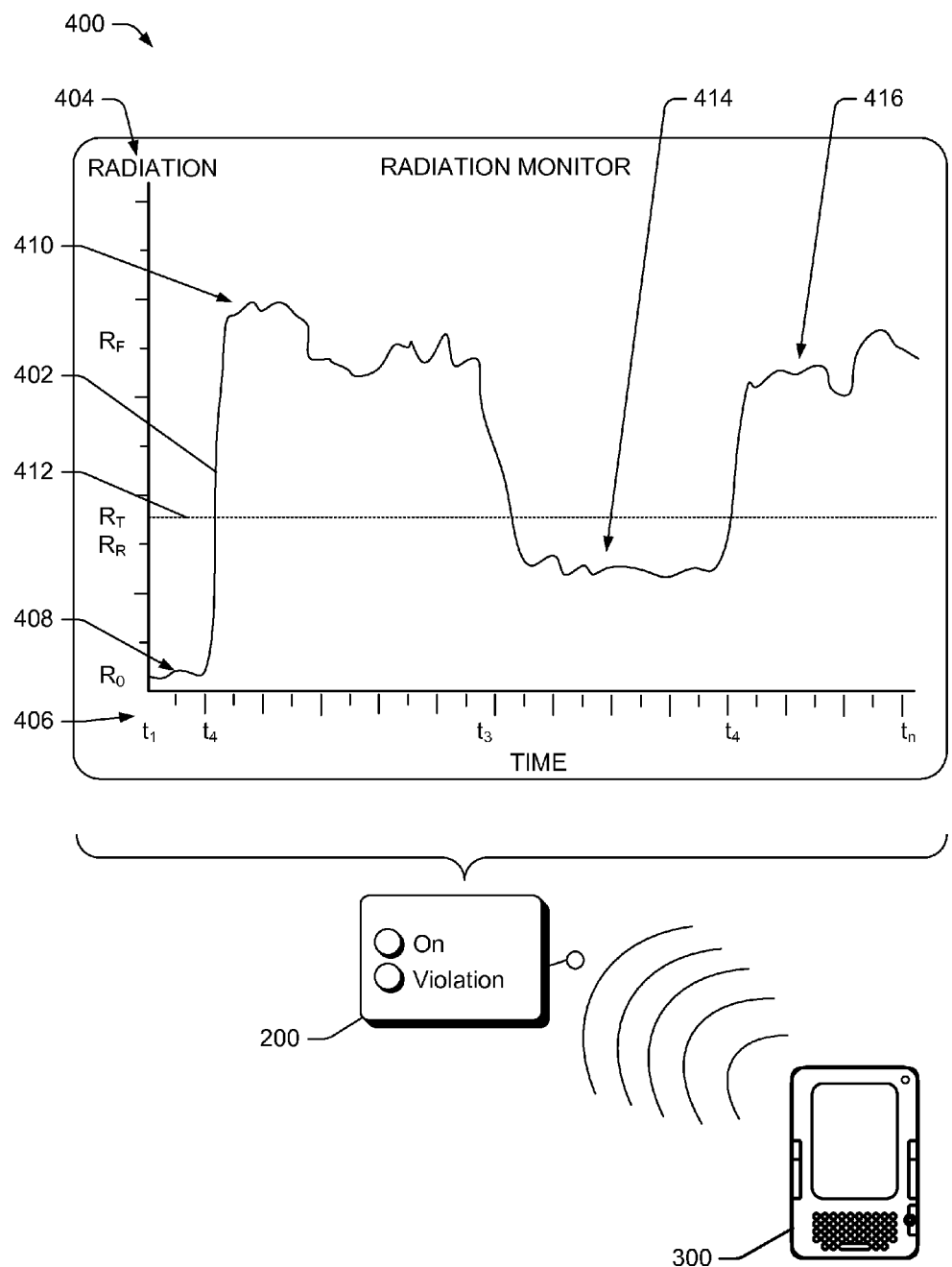
FIG. 4 is a schematic diagram of an illustrative radiation monitor that shows radiation emitted from a computing device.

FIG. 4 is a schematic diagram of an illustrative radiation monitor 400 that shows radiation emitted from a computing device. The radiation may be measured by the detection device 200, which may be exposed to the computing device 300. The radiation may be electromagnetic (EM) radiation or other types of radiation. In some embodiments, the detection device 200 may be used in conjunction with the computing device 300 to determine whether the computing device is operating in compliance with an operational policy, such as when the detection device 200 is implemented as an accessory to the computing device 300.

The radiation monitor 400 shows illustrative levels of radiation 402 by way of a plot of radiation (R) 404 over time (t) 406. Various operational states (or modes) are shown in the radiation monitor 400 by the illustrative levels of radiation 402 for an example operation of the computing device 300 between times $t_1$ and $t_n$. The radiation 402 may be intentional or incidental radiation that is emitted from operation of the various components 302 of the computing device 300. The radiation 404 may indicate use of the computing device or of various components of the computing device, which may be in violation of an operational policy. An operational policy may be aimed at lowering radiation, limiting or restricting wireless communications, limiting use of some components of the computing devices, and/or aimed at other objectives.

At time $t_1$, the computing device 300 may operate in a low power mode or may be powered off. In this state, the computing device 300 may generate a level of radiation of approximately $R_0$, which is represented by an illustrative low power segment 408 on the monitor 400. The radiation level of $R_0$ may be greater than zero radiation because some of the components 302 may still require power consumption and/or otherwise emit small levels of radiation from the computing device 300 even when components are powered off, in a sleep mode, in a hibernate mode, etc.

At time $t_2$, the computing device 300 may resume a full operational mode that may include a level of radiation of approximately $R_F$, which is represented by an illustrative full power segment 410 on the monitor 400. The radiation level of $R_F$ may vary based on use of various ones of the components 302 during operation between times $t_2$ and $t_3$. For example, during the operation, the computing device 300 may vary the power of the CPU(s) 306 and the GPU(s) 314, activate or deactivate the input/output devices 320, adjust display settings, perform transmission or receipt of data via the radio(s) 316, or perform other functions using the various components 302, thereby producing and emitting different levels of radiation.

In accordance with various embodiments, the level of radiation $R_F$ may be greater than an emissions threshold 412 denoted by $R_T$. In some embodiments, the emissions threshold $R_T$ 412 may be a predetermined amount or level of radiation emissions that are acceptable for a particular operational environment based on an operational policy. For example, a level of $R_T$ may be an emissions threshold allowed during takeoff and landing of commercial aircraft, during operation in a hospital environment, in a laboratory, or in other environments that may desire to limit emissions of radiation emitted by the computing device 300. In various embodiments, the emissions threshold $R_T$ 412 may be a predetermined amount or level of emissions that indicates use of the computing device or use of particular components of the computing device.

At time $t_3$, the computing device 300 may initiate a reduced operational mode that may include a level of radiation of approximately $R_R$, which is represented by an illustrative reduced power segment 414 on the monitor 400. The computing device 300 may reduce power to and/or deactivate one or more of the components 302 to achieve the reduced power radiation $R_R$. For example, the computing device 300 may power off one or more of the radio(s) 316, the GPU(s) 314, cores of the CPU(s) 306, or other components to reduce the radiation from $R_F$ to $R_R$. As shown in the monitor 400, the reduced level of radiation $R_R$ is less that the emissions threshold $R_T$ 412, which may allow operation of the computing device 300 in an environment which imposes restrictions on radiation emissions by computing devices.

At time $t_4$, the computing device 300 may resume a full operational mode that may include a level of radiation of approximately $R_F$, which is represented by an illustrative full power segment 416 on the monitor 400. For example, the computing device 300 may resume the full operational mode following a user input (e.g., access code, etc.) or by other means. The computing device 300 may restore full power to and/or reactivate one or more of the components 302 to achieve the full operational mode that includes a corresponding full power level of radiation $R_F$. For example, the computing device 300 may power on one of the radios 316, the GPU(s) 314, or other devices that were powered off during the reduced operational mode represented by the segment 414 in the monitor 400.

Illustrative Operation

Figure 5:
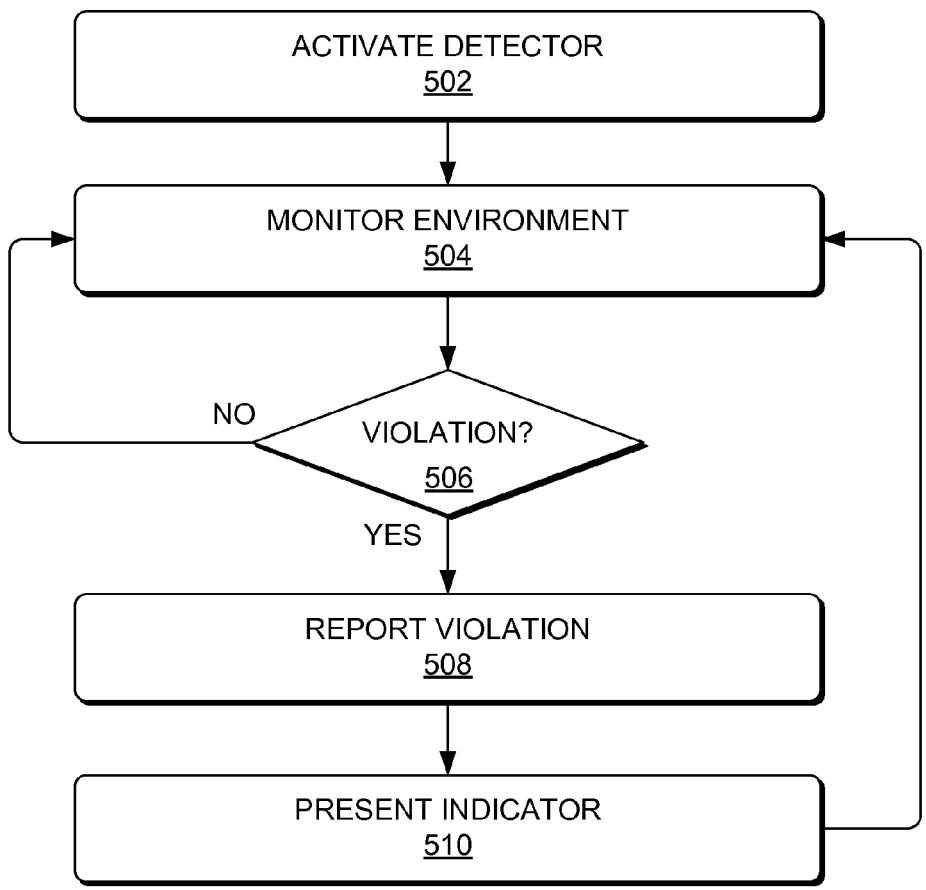
FIG. 5 is a flow diagram of an illustrative process to monitor an environment to determine whether a computing device is operating in violation of an operational policy.

FIG. 5 is a flow diagram of an illustrative process 500 to monitor an environment to determine whether a computing device is operating in violation of an operational policy. The process 500 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly. The process 500 is described with reference to the environment 100 and may be performed by the detection device 200. Of course, the process 500 may be performed in other similar and/or different environments.

At 502, the detector device 200 may activate the detector 204 and/or the input/output devices 214. For example, the detector device 200 may turn on the detector 204 to enable measurement of the EM radiation in the boundary 106.

At 504, the detector device 200 may monitor an environment that includes the computing device 300 to determine whether the computing device is operating within an operational policy or in violation of the operational policy. For example, the detector device 200 may measure EM radiation emissions by the computing device 300. The detection device 200 may also attempt to connect with the computing device 300 via the input/output devices 214, such as to determine whether the computing device has deactivated wireless communication devices (e.g., a radio transmitter) in accordance with an operational policy.

At 506, the detection device 200, via the module(s) 210, may determine whether the monitoring at 504 has detected a violation of the operational policy. For example, the decision block 506 may compare measured EM radiation emissions to an emissions threshold to determine whether a violation has occurred. In other instances, any detection may trigger a violation, such as any detected use of a wireless communication device.

When the detection device 200 detects a violation at the decision operation 506 (following the "yes" route), then at 508 the detection device 200 may report the violation. For example, the violation may be reported to a centralized source, recorded for later use, or otherwise reported to the detector device for further processing. At 510, the indicator 212 may present an indication of the violation, such as by emitting a visible indicator (e.g., light, etc.), emitting a sound, causing a tactile indication (e.g., vibration, etc.), or a combination thereof. In some embodiments, the process 500 may direct the detection device 200 to present an indicator at the block 510 when the computing device 300 conforms to the operational policy rather than or in conjunction with presenting the indicator for violations.

Illustrative Detection Devices

Figure 6:
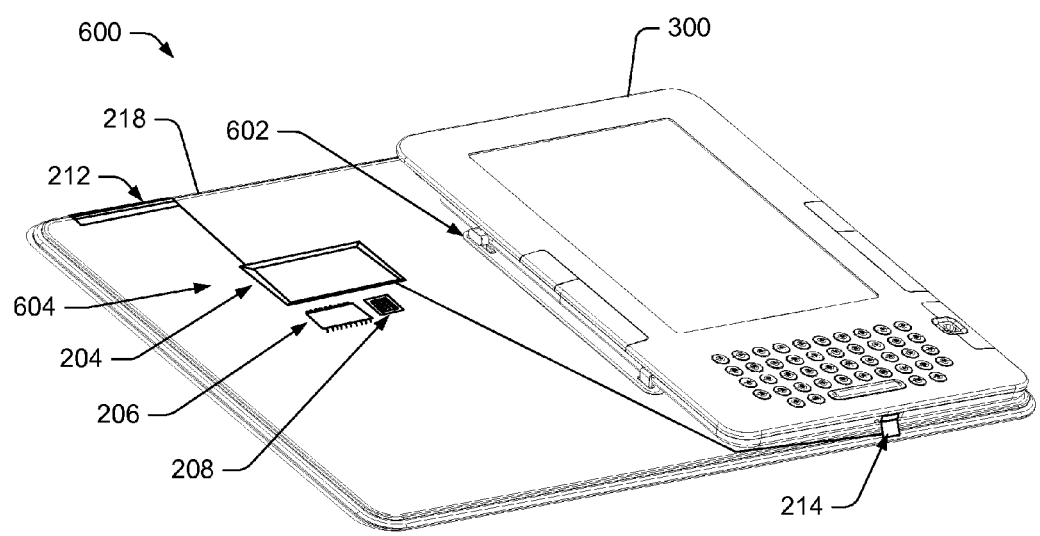
FIG. 6 is a schematic diagram of a detection device that is implemented as an accessory of the computing device.
Figure 7:
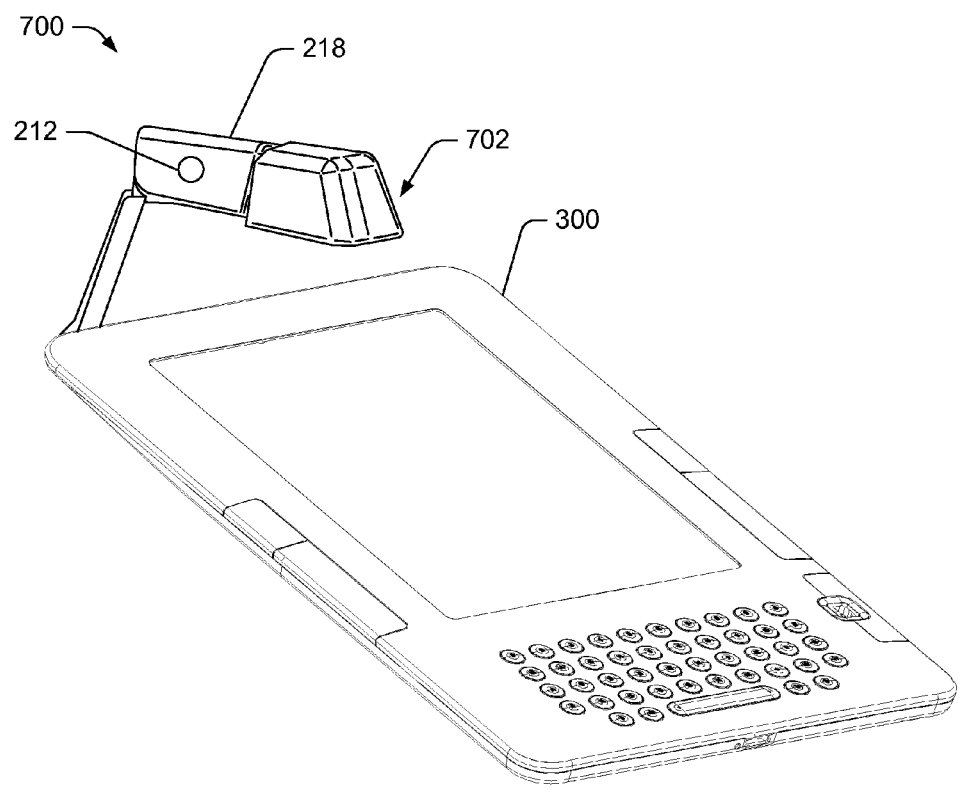
FIG. 7 is a schematic diagram of another detection device that is implemented as an accessory of the computing device.
Figure 8:
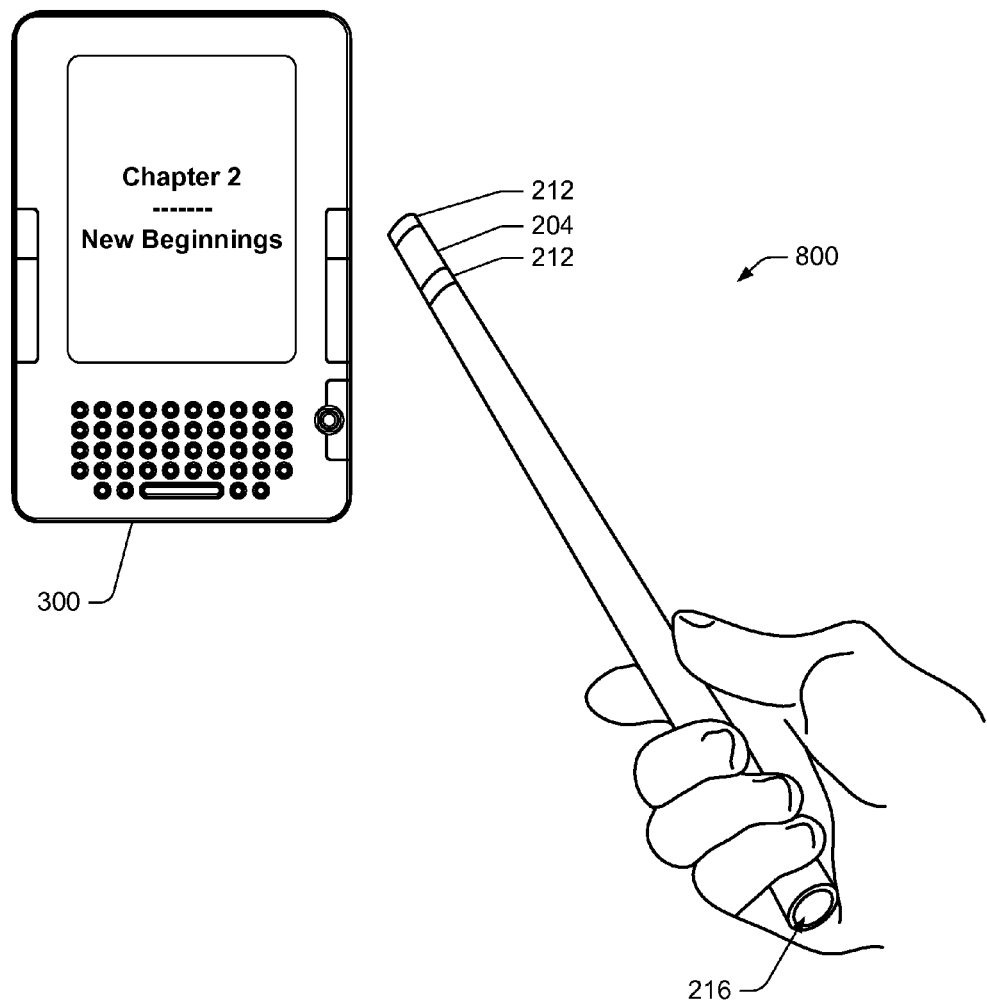
FIG. 8 is a schematic diagram of a detection device that is implemented as a portable device to determine compliance of a computing device with respect to an operational policy.
Figure 9:
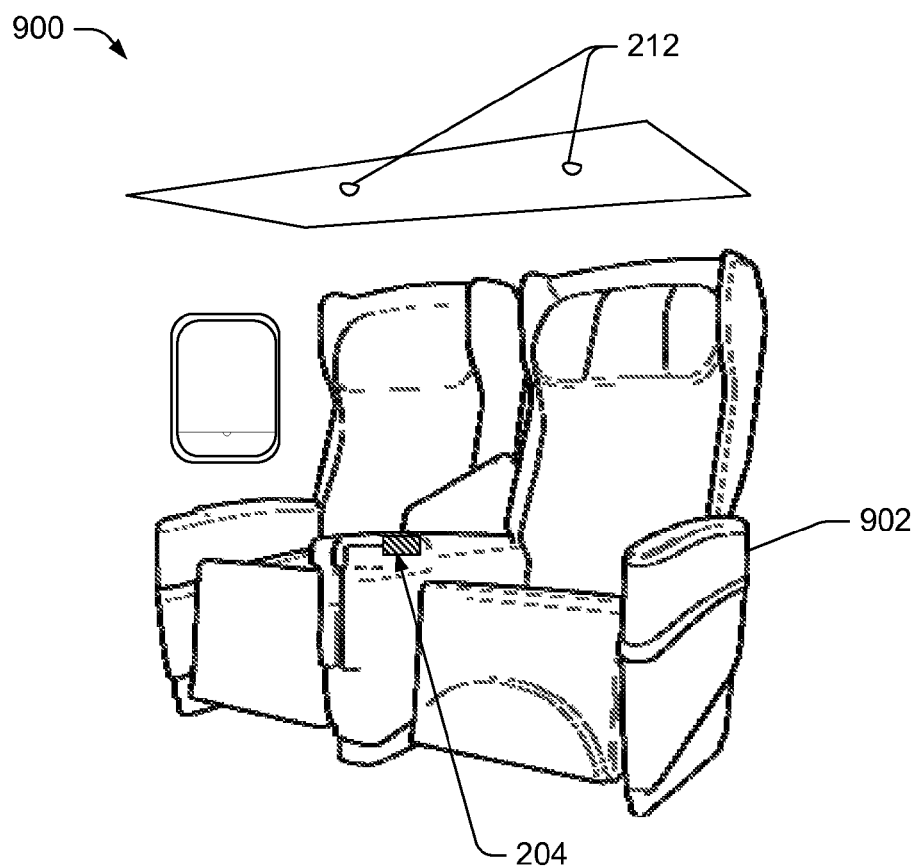
FIG. 9 is a schematic diagram of a detection device that is implemented with a stationary fixture to determine compliance of a computing device with respect to an operational policy.
Figure 10:
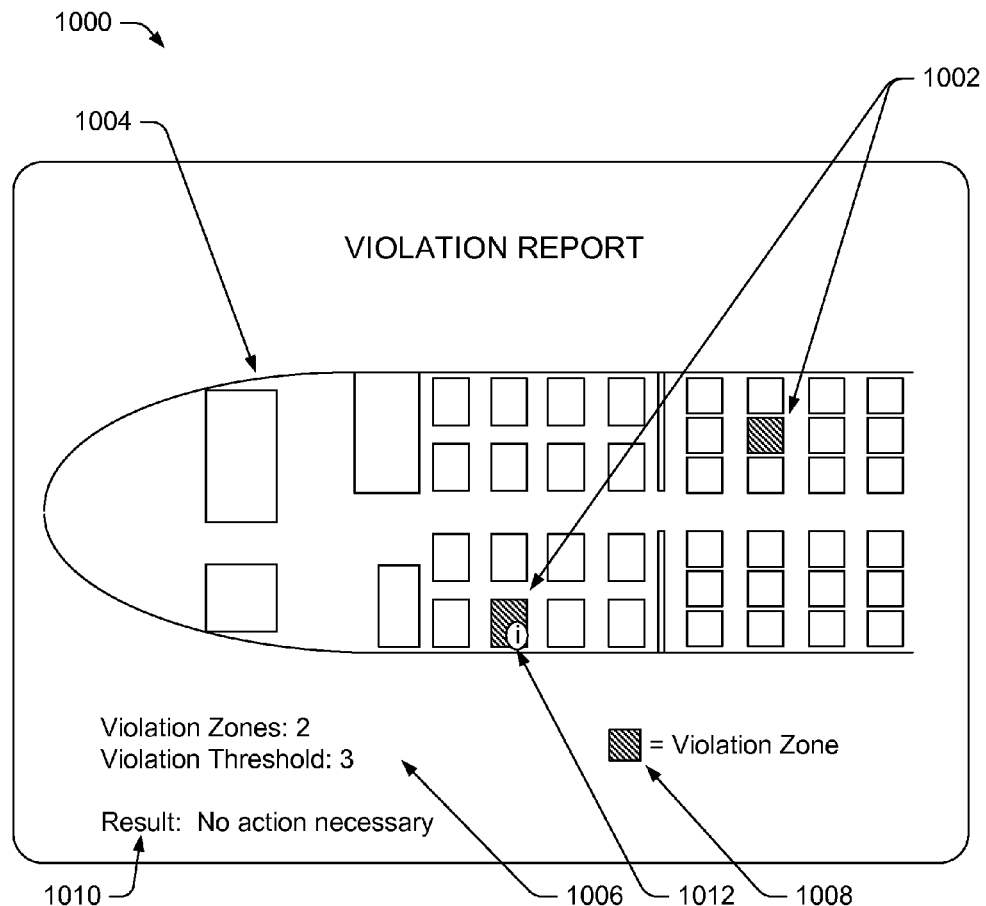
FIG. 10 is a schematic diagram of an illustrative report that aggregates information from one or more detection devices.

FIGS. 6-9 show various implementations of the detection device 200. The detection device 200 may be implemented as an accessory paired with the computing device 300, as shown in FIGS. 6 and 7. The detection device 200 may also be implemented separate from the computing device, such as shown in FIGS. 8 and 9, such as in an environment that includes the operational policy and can provide the detection device for monitoring purposes. FIG. 10 shows reporting of one or more detection devices in an illustrative environment, such as an aircraft or other environment (classroom, hospital, museum, etc.) that includes the operational policy.

FIG. 6 is a schematic diagram of a detection device 600 that is implemented as an accessory of the computing device. In some embodiments, the detection device 600 may be formed to include the housing 218 that acts as a cover and couples to the computing device 300. The housing 218 may include features 602 configured to couple the detection device 600 to the computing device 300. The term "couple" or "couples" means that the detection device may attach to the computing device, slidably connect to the computing device, and/or contain to the computing device (e.g., via a pouch or other cavity), permanently or temporarily.

The detection device 600 may include a detection portion 604 that includes the detector 204, the processor 206, the memory 208, and/or the input/output devices 214 (e.g., a data port connector). The detector 204 may be located in the housing 218 in a location that is adjacent to a wireless transmitter, a CPU, a GPU, or other components of the computing device 300 to enable accurate measurement of EM radiation or other types of radiation emitted by the computing device.

The detector 204 may be coupled to the indictor 212, which may be implemented as a visual indicator that shows compliance or lack of compliance with an operational policy. For example, the indicator 212 may provide a green light when the computing device 300 is compliant with an operational policy and a red light when the computing device is in violation of the operational policy. The detection device 600 may share a power source with the computing device 300 via a data port as one of the input/output devices 214 or using other connections. For example, the detection device 600 may share the power source with the computing device 300 by a connection through the features 602 configured to couple the detection device 600 to the computing device 300. In some embodiments, the detection device 600 may include a battery or other power source and not be dependent on power received from the computing device 300. The detection device 600 may operate and monitor many types of computing devices, such as legacy computing devices, because the detection device detects an operational state of the computing device by measuring radiation emitted by the computing device and/or use of a wireless communication device via wireless signals exchanged with the computing device, which is independent from a model or version of the computing device.

FIG. 7 is a schematic diagram of another detection device 700 that is implemented as an accessory of the computing device. The detection device 700 may provide detection capabilities that are similar to the detection device 600, but may include a housing (the housing 218) that provides other utility, such as the utility of a light source 702. The detection device 700 may include the indicator 212 to indicate a violation or compliance of the computing device 300 with an operational policy. The detection device 700 may include the various components 202 as discussed with reference to the detection device 200. The detection device 700 may includes its own power source (e.g., batteries, external plug) or may connect to a data port of the computing device to share a power source with the computing device.

FIG. 8 is a schematic diagram of a detection device 800 that is implemented as a portable device to determine compliance of a computing device with respect to an operational policy. The detection device 800 may be a self contained detection device (i.e., a portable device) that includes the detector 204, the indicator 214, the power source (e.g., battery, etc), and/or other ones of the components 202. The detection device 800 may be formed as a wand to allow a user, such as a flight attendant or proctor to quickly identify whether computing devices are operating in accordance with an operational policy based on EM radiation, radio wave detection, and/or other techniques discussed herein. However, the portable device may be implemented in other shapes or forms. The detector 204 may be located near a distal end of the housing 218 to enable the user to move the detector 204 proximate computing devices (or areas likely to store computing devices such as bags, etc.) during a detection process. In use, the detection device 800 may be used monitor many computing devices that are within the boundary 106 of the detection device, such as by moving the wand near passengers, exam takers, or other people that may use computing devices subjected to operational policies.

In some embodiments, the detection device 600, 700, or 800 may be a passive detection device that relies, at least in part, on power received from an external device (e.g., the computing device 300) via wireless transmission. For example, the detector 204 of the detection device 800 may receive a low power signal from the computing device 300, which may power the detection device 800 and enable detection of radiation emissions from the computing device.

FIG. 9 is a schematic diagram of a detection device 900 that is implemented with a stationary fixture to determine compliance of a computing device with respect to an operational policy. The detection device 900 may be integrated within another fixed object 902, such as a workstation, a seat, a passenger compartment, or other areas where computing devices may be subjected to operational policies. The detection device 900 may be integrated in a passenger seat to determine, during various time periods, whether computing devices are violating an operational policy. For example, the detection device 900 may monitor activity (e.g., radiation emissions, radio waves, etc.) of computing devices that are located proximate the detection device 900 during take-off and landing procedures of an aircraft. The detection device 900 may be in communication with the indictors 214 (possibly via the processors) to enable reporting of violations of (or compliance with) the operational policy, as shown in FIG. 10.

FIG. 10 is a schematic diagram of an illustrative report 1000 that aggregates information from one or more detection devices, such as the detection device 900. The report 1000 may include location information of computing devices that violate the operational policy. For example, the report 1000 may indicate violation zones 1002 within a map 1004 of an area. The report 1000 may be generated from information input from various detection devices deployed within the area, such as the detection devices 900 and/or from detection devices that move through the area, such as the detection device 800, which may transmit location references along with violation codes to a source (e.g., a centralized server, etc.) that may compile the report 1000. For example, the location references may be base on a location of the detection device when the detection device detects a computing device that is operating in violation of an operational policy. The location information may be extracted from an environment that the detection device operations within, such as by use of radio frequency identification (RFID) tags or other location references.

The report 1000 may include statistics 1006 which show data about violations, which may be identified via an icon defined by a key 1008. For example, the statistics may show a number of violations (e.g., 2) and a violation threshold, that when reached or exceeded requires intervention (e.g., asking users to modify an operational state of their computing devices to comply with an operational policy, etc.). However, in some instances the threshold may permit some level of violation of the operation policy prior to taking or suggesting corrective action as shown by an action alert 1010.

In some embodiments, the report 1000 may include additional information about the violation, such as information about a computing device responsible for the violation. For example, the detection device (or a user operating the detection device) may collect information 1012 about violations, which may be included in the report 1000. Repeat offenders may be flagged in the report 1000. The detection device may obtain information about the computing device (e.g., model number, user name, etc.) by pinging the computing device and requesting this information or by other techniques (e.g., user input, etc.). The information may further include additional data, such as an explanation of use. For example, the information may include a justification to allow a user, such as an air marshal or a teacher, to continue to use a computing device that violates the operational party.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A portable detection device comprising:
   a portable accessory housing configured to selectively couple to and de-couple from a mobile computing device that is different than the portable detection device;
   a processor disposed in the portable accessory housing;
   a detector disposed in the portable accessory housing and in communication with the processor, the detector to measure electromagnetic (EM) radiation emitted from the mobile computing device when the portable accessory housing is coupled to the mobile computing device; and
   an indicator disposed in the portable accessory housing and in communication with the processor, the indicator to receive a signal from the processor and, in response to the signal, to visually indicate whether the mobile computing device is operating in compliance with an operational policy, the operational policy permitting use of the mobile computing device in a controlled radiation mode wherein one or more particular components of the mobile computing device are allowed to operate at a throttled power state to prevent the EM radiation from exceeding a predetermined radiation threshold.

2. The portable detection device as recited in claim 1, wherein the portable accessory housing, when coupled to the mobile computing device, further acts as a removable protective cover for the mobile computing device.

3. The portable detection device as recited in claim 1, wherein the detector is further configured to initiate a handshake with a radio of the mobile computing device prior to measurement of the EM radiation.

4. The portable detection device as recited in claim 1, wherein the EM radiation is caused by at least one of a central processing unit or a graphics processing unit of the mobile computing device, and wherein at least one of the central processing unit or the graphics processing unit are throttled down to reduce the EM radiation to be equal to or below the predetermined radiation threshold.

5. A detection device comprising:
   a detector to measure radiation emitted from a mobile computing device that is different than the detection device and located proximate to the detection device, the mobile computing device including:
      at least one radio hardware component, and
      at least one other hardware component that is not a radio;
   an accessory housing to couple the detector to a processor and a memory, the accessory housing configured to selectively couple the detection device to the mobile computing device, wherein the processor is in communication with the detector to control operation of the detector, and wherein the memory stores instructions that, when executed by the processor, cause the processor to perform acts comprising:
      causing a measurement of emissions of radiation generated from the at least one radio hardware component of the mobile computing device, the at least one other hardware component of the mobile computing device, or both;
      comparing the measurement to an emissions threshold that indicates use of one or both of the at least one other hardware component or the at least one radio hardware component; and
      determining based at least in part on the comparing:
         compliance with an operational policy by the mobile computing device based on the measurement being a first level of radiation that indicates use of the at least one other hardware component; or
         a violation of the operational policy by the mobile computing device based on the measurement being a second level of radiation that indicates use of the at least one radio hardware component.

6. The detection device as recited in claim 5, wherein the accessory housing is formed as a removable accessory cover for the mobile computing device.

7. The detection device as recited in claim 5, wherein the accessory housing includes a connector to enable the detection device to draw power from the mobile computing device.

8. The detection device as recited in claim 5, wherein the detector is located in a fixture proximate to a location of frequent usage of the mobile computing device.

9. The detection device as recited in claim 5, wherein the instructions further cause the processor to perform an act comprising transmitting a result of the determining to a centralized component that compiles information from the detection device and outputs the information.

10. The detection device as recited in claim 9, wherein the instructions further cause the processor to perform an act comprising transmitting location information to the centralized component, the location information associated with individual mobile computing devices determined to be using the at least one second component.

11. The detection device as recited in claim 5, further comprising an indicator to emit a sound, emit a visual indication, or provide tactile feedback in response to determining the violation of the operational policy by the mobile computing device.

12. A method, comprising:
    measuring, by an electromagnetic (EM) sensor coupled to a first computing device, EM radiation emissions from a second computing device that is selectively coupled to the first computing device;
    comparing, the EM radiation emissions from the second computing device to an emissions threshold that is associated with an operational policy that governs use of the second computing device, wherein the operational policy restricts use of a radio hardware component of the second computing device and permits use of at least one hardware component of the second computing device that is not a radio;
    determining, based on the measuring the EM radiation emissions from the second computing device a violation of the operational policy by the second computing device based on the EM radiation emissions exceeding the emissions threshold; and
    indicating the violation of the operational policy based at least in part on the determining.

13. The method as recited in claim 12, further comprising initiating, by the first computing device, a handshake protocol with the second computing device prior to the measuring the EM radiation emissions.

14. A detection system comprising: a housing that is configured to at least partially cover a computing device when coupled to the computing device;
   a processor disposed in the housing;
   a detector disposed in the housing and in communication with the processor, the detector to measure emissions from the computing device;
   an indicator disposed in the housing and in communication with the processor, the indicator to receive a signal from the processor and, in response to receiving the signal, to indicate whether the emissions measured by the detector are one of above or below an emissions threshold, wherein the emissions being above the emissions threshold is indicative that the computing device is operating within a full operational mode and the emissions being below the emissions threshold is indicative that the computing device is operating within a reduced operational mode; and
   a compiler that collects information regarding the emissions from the indicator and other indicators, and outputs the information for display to provide information about a plurality of computing devices, the information indicating whether one or more particular types of components of the plurality of computing devices are in use.

15. The detection system as recited in claim 14, wherein the detector is located in a fixture proximate to a location of frequent usage of the computing device.

16. The detection system as recited in claim 14, wherein the displayed information comprises one or more of:
   a visual representation of repeated areas of the signals;
   an indicator of different types of activity represented by the signals;
   a plot of emissions over time; or
   a set of violation areas indicated on a visual map of a surrounding area.

17. The detection system as recited in claim 14, wherein the housing is shaped in a form of a wand that secures the detector proximate to a tip of the wand.

18. The detection system as recited in claim 14, wherein the detection device wirelessly measures the emissions from the computing device as electromagnetic radiation emissions.

19. The detection system as recited in claim 14, wherein the detection device wirelessly measures the emissions from the computing device as radio wave emissions.

20. The method as recited in claim 12, wherein the determining the violation of the operational policy by the second computing device includes determining that the second computing device is transmitting wireless signals from a radio hardware component.

21. The method as recited in claim 12, further comprising initializing, by the first computing device, wireless communication between the first computing device and the second computing device.

22. The method as recited in claim 12, wherein the indicating the violation of the operational policy includes emitting at least one of a sound or a light.

23. The method as recited in claim 12, wherein the indicating the violation of the operational policy includes transmitting an indication to a compiler, the compiler to output information indicating whether one or more particular types of components of a plurality of computing devices are in use.

24. The method as recited in claim 12, further comprising:
   determining a location of the second computing device; and
   transmitting, by the first computing device, an indication of the location to a centralized repository.

* * * * *